US005638766A

United States Patent [19]
Pusterla

[11] Patent Number: 5,638,766
[45] Date of Patent: Jun. 17, 1997

[54] WATER CRAFT WITH DISC SURFACE SKIMMERS

[76] Inventor: Anthony Francis Pusterla, Unit 3/13. Brown Street, Southport Queensland 4215, Australia

[21] Appl. No.: 454,105
[22] PCT Filed: Dec. 8, 1993
[86] PCT No.: PCT/AU93/00632
   § 371 Date: Jul. 25, 1995
   § 102(e) Date: Jul. 25, 1995
[87] PCT Pub. No.: WO94/13527
   PCT Pub. Date: Jun. 23, 1994

[30] Foreign Application Priority Data
Dec. 9, 1992 [AU] Australia .................... PL6260

[51] Int. Cl.$^6$ .................................... B63B 1/24
[52] U.S. Cl. ........................... 114/274; 114/280
[58] Field of Search ................... 114/271, 274, 114/281, 282, 283, 67 A, 67 R

[56] References Cited

U.S. PATENT DOCUMENTS

| | | | |
|---|---|---|---|
| 1,738,410 | 12/1929 | Weir | 114/271 |
| 2,488,310 | 11/1949 | Mayer. | |
| 3,237,582 | 3/1966 | Sturgeon et al. | 114/271 |
| 4,061,104 | 12/1977 | Pinchot, III | 114/281 |
| 5,171,623 | 12/1992 | Yee | 114/67 A |

FOREIGN PATENT DOCUMENTS
2470723  12/1981  France.

*Primary Examiner*—Edwin L. Swinehart
*Attorney, Agent, or Firm*—Townsend and Townsend and Crew LLP

[57] ABSTRACT

A watercraft comprises a hull having an upper surface, a lower surface, a bow and a stern. Spaced from the underside of the watercraft at the bow end is a pair of outwardly extending arms rotatably supporting discs. Likewise at the stern of the hull, a pair of arms rotatably supports an additional pair of discs. A multitude of such discs may additionally be provided with bearings. Alternatively, the discs may be mounted upon a ball joint arrangement for rotation and pivoting throughout a preselected range. Each disc is acutely angled from a horizontal reference plane. When the watercraft moves in a forward direction, the discs will rotate. As a result, the relative contact velocity between an underside portion of the discs and the water is substantially reduced as compared to a surface which is fixed to the watercraft. The contact friction is thereby reduced resulting in high speed capabilities of the craft with relatively low powered propulsion units.

11 Claims, 4 Drawing Sheets

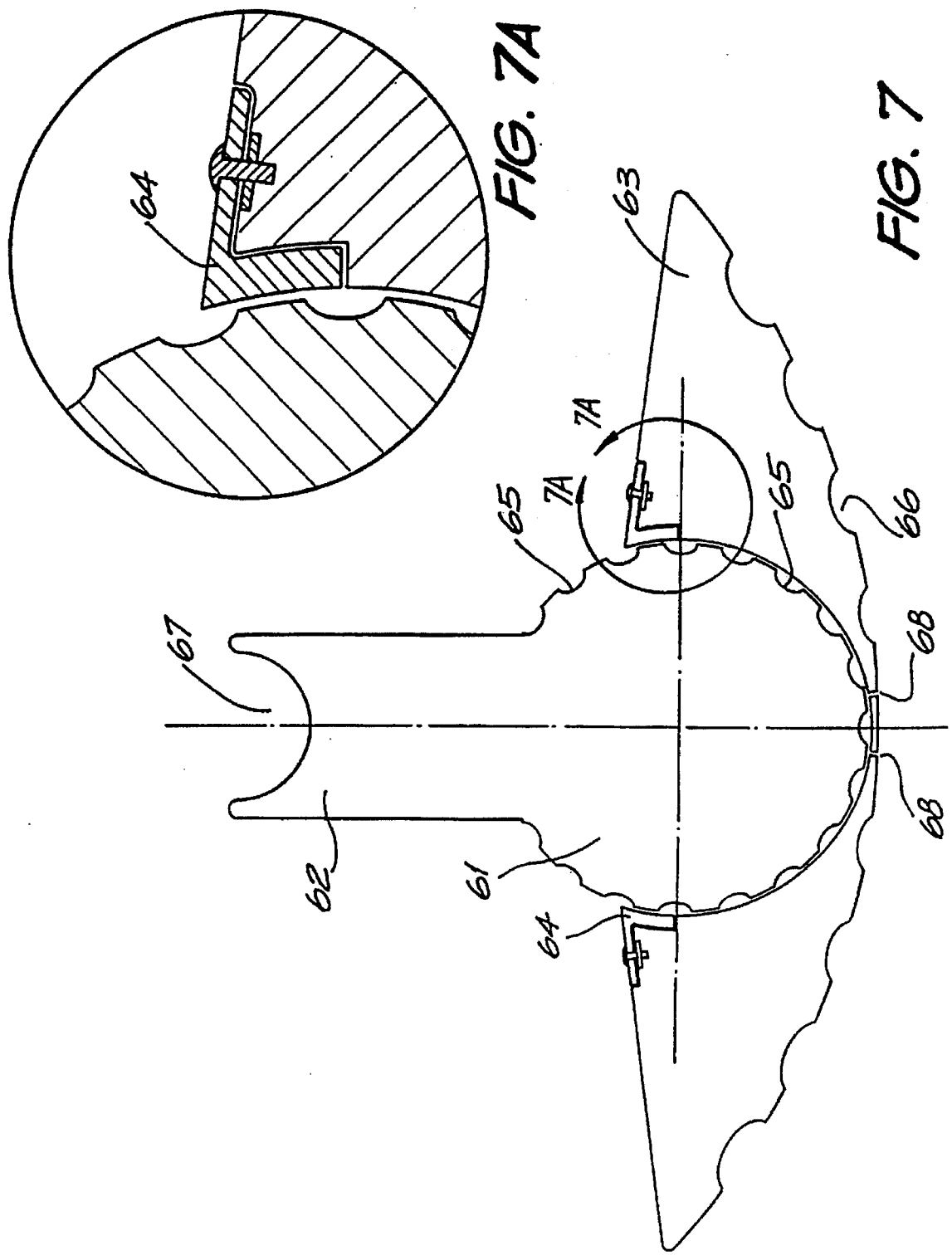

WATER CRAFT WITH DISC SURFACE SKIMMERS

FIELD OF THE INVENTION

The following invention relates to a water craft and more particulary, though not exclusively to a surface skimming water craft.

DISCLOSURE OF THE INVENTION

There is disclosed herein a water craft comprising:

a hull having a main longitudinal axis defining a direction of travel of the craft.

a plurality of discs located at respective opposed sides of the main longitudinal axis to and below the hull and in combination having sufficient buoyancy to support the hull above the water, each disc comprising an essentially circular skimming surface adapted to skim upon the water as the craft moves at speed, each disc being adapted to rotate about a rotational axis which projects laterally at an acute angle with respect to a horizontal reference plane such that the skimming surface faces downwardly and outwardly with respect to the longitudinal central axis of the hull.

Preferably, the discs may be free spinning or rotatably driven.

Preferably, said acute angle is less than 45°.

Preferably, the circular surface of each sics is convex.

Preferably, the contour of the underside of the hull is such that a point of maximum air pressure therebeneath corresponds with the centre of gravity of the craft.

Preferably, the hull body and discs are formed of moulded plastics material.

Preferably, the discs are pivotally mounted to the hull.

Preferably, said pivotal mounting is by way of a ball joint.

Preferably, the ball joint comprises a ball affixed to or integrally formed with a leg extending from the hull, the ball extending into a socket formed within the disc and being retained therein by a retention flange secured to the discs Typically, the main craft body or hull is supported above and out of the water as a result of buoyancy of the discs. The discs may be considered the main or only buoyancy for the water craft. That is, the total buoyancy of the craft is dependent upon the configuration, size and/or number of discs attached.

As the discs are for use in a liquid environment, it is necessary to lay them down so as, when stationary, the maximum of surface area is in contact with the water, thus gaining the maximum of buoyant effect.

Beneficially, it is necessary to predispose the angles of the discs relative to the water surface, in such a way as to place the inside, rear quadrant of the bottom disc surface at the lowest point. This area is considered to be the maximum area of grip upon the disc. To achieve this, it is typical to provide a forward uptilt and an outside uptilt so as to give this contact area the maximum effect and increase in performance as forward motion is applied to the craft. This enables the discs to become controlled, forward rotating, deflected, multi-directional discs.

Typically, there are provided circular, non-directional, concave indentations on the underside surface near the outer perimeter of each disc to provide grip and decrease slippage on the disc surface.

It might be necessary, dependent upon the size and configuration of the craft and discs to limit the angle through which the discs may pivot. At no time should the leading edge of the discs drop below the horizontal as this would allow the disc to penetrate or dive below the surface, thus "tripping" the craft. To this end, pivot limitation devices may be adapted to cooperate with each disc.

The bearing surfaces of the discs consist, typically of one dimpled, spherical, non-rotating fixture and one matching smooth surfaced cup located within the disc. The dimples might act to reduce the surface area and friction whilst capturing water and air within the assembly which acts as a lubricant and negates the need for mechanical metal adaptions.

BRIEF DESCRIPTION OF THE DRAWINGS

Preferred forms of the present invention will now be described by way of example with reference to the accompanying drawings, wherein:

FIGS. 7 and 7A are schematic cross sectional elevational view of the assembly of FIG. 6.

DESCRIPTION OF THE PREFERRED EMBODIMENTS

Figure 1:
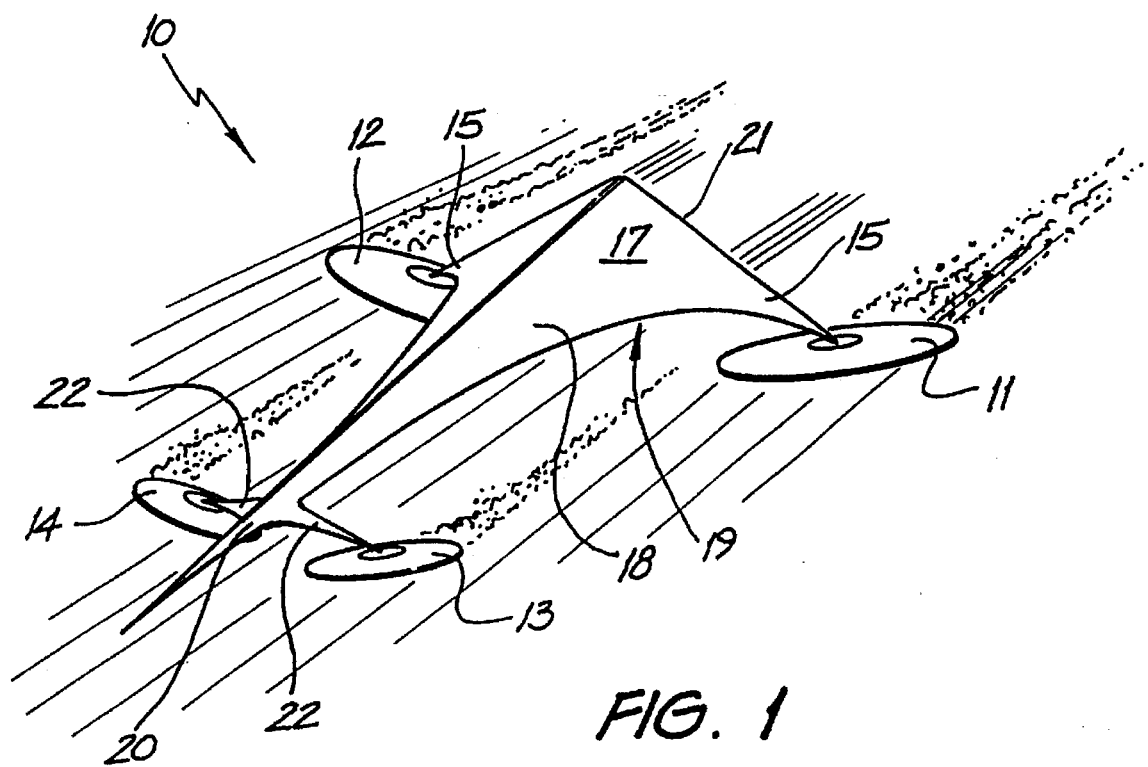
FIG. 1 is a schematic perspective view of a water craft.

In FIGS. 1 to 5 of the accompanying drawings there is schematically depicted a water craft 10. Water craft 10 comprises a hull 17 having an upper surface 18, a lower surface 19, a bow 20 and a stern 21.

Spaced from the underside 19 of craft 10 at the stern end 20 thereof is a pair of outwardly extending arms 22 rotatably supporting discs 13 and 14. Likewise, at the stern 21 of hull 17 a pair of arms 15 rotatably supports an additional pair of discs 11 and 12.

Propulsion for craft 10 may be provided by an outboard motor mounted at the stern 21, or by jet propulsion or any other suitable means. For example, craft 10 may be a sall craft.

The contour of the underside 19 of the craft may be designed to provide a positive pressure below the craft at speed.

With reference to FIGS. 2 to 5, discs 11, 12, 13 and 14 are rotatably mounted upon bearings or the like.

Figure 5:
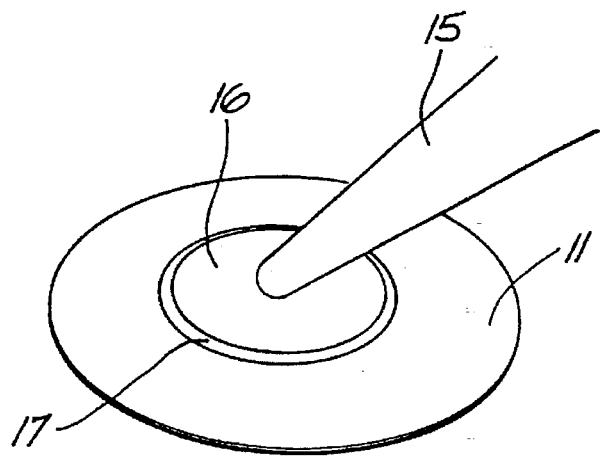
FIG. 5 is a schematic perspective view of a disc.

As shown in FIG. 5, disc 11, which may be formed of moulded plastics, fibreglass, aluminium steel or any other suitable material may be rotatably mounted upon a fixed hub 16. Hub 16 is in turn connected by suitable means to arm 15. A sealing skirt 17 may be provided to protect the bearings within disc 11 from water.

Figure 2:
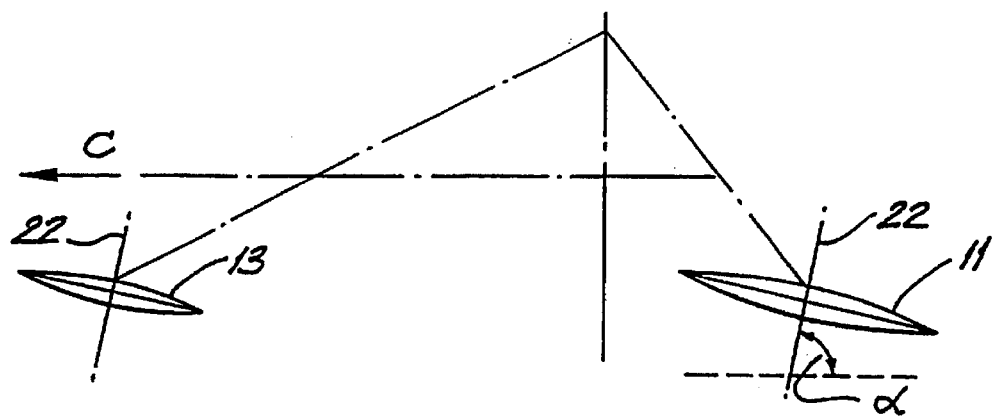
FIG. 2 is a schematic side elevational view depicting the arrangement of the discs of the craft in FIG. 1.
Figure 4:
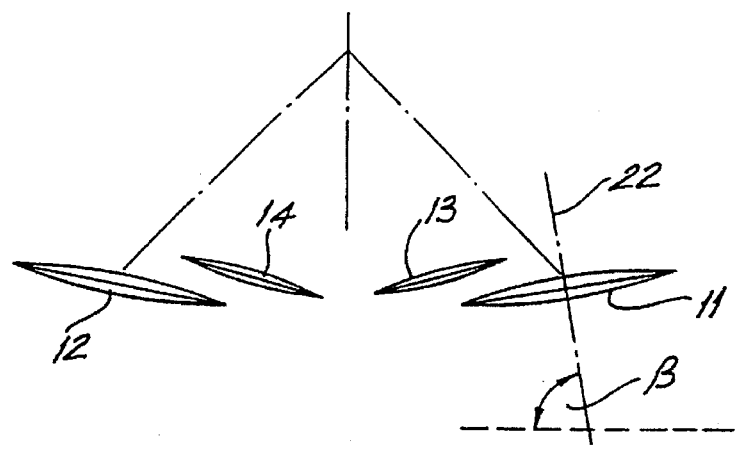
FIG. 4 is a schematic forward elevational view of the arrangement of FIG. 2 and 3.

With reference to FIGS. 2 and 4, each disc is acutely angled from a horizontal reference plane. When viewed laterally, the rotational axis 22 of disc 11 might be at a fixed angle $\alpha$ relative to the horizontal. Angle $\alpha$ might be somewhere between 45° and $\pi$°.

When viewed from the front or rear, the rotational axis 22 of disc 11 extends at a fixed angle $\beta$ relative to the horizontal. Angle $\beta$ might also be somewhere between 45° and 90°.

It should be appreciated that angles α and β although preferably fixed may be adjustable. That is, for high speed applications, α and β might be quite close to 90° whereas for low speed applications, angles α and β may be closer to 45°.

Figure 3:
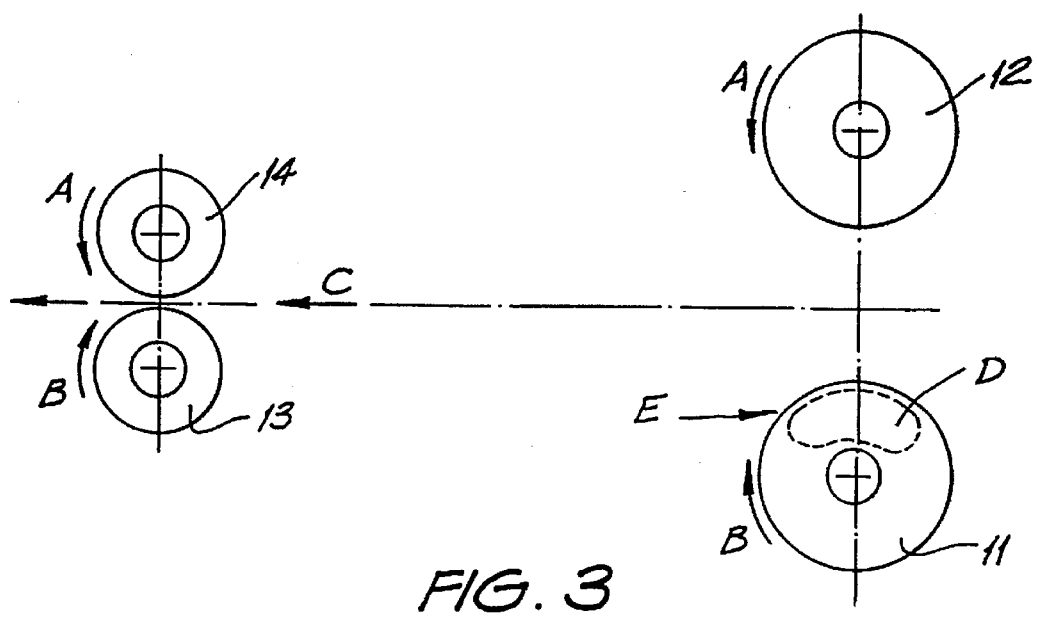
FIG. 3 is a schematic plan view of line arrangement of FIG. 7.

With reference to FIG. 3 as craft 10 moves in a forward direction indicated by arrow C, discs 12 and 13, which are free spinning, will rotate in an anti-clockwise direction as indicated by arrows A. Similarly, discs 11 and 13, which are free spinning, will rotate in a clockwise direction as indicated by arrows B.

The discs rotate as a result of the flow of water therepast. In the case of disc 11, and as shown in FIG. 3, zone D of the underside of the disc is acted upon by water flowing in the direction indicated by arrow E. It is that flow that causes rotation of disc 11 in the direction indicated by arrow B.

As a result, the relative contact velocity between the underside of disc 11 and the water is substantially reduced as compared to a disc which were fixed. It is this reduction in contact friction which, it is believed, will result in high speed capabilities of craft 10 with relatively low powered power units.

Discs 11, 12, 13 and 14 may be separately rotatably driven. In this case, a number of radially extending fins may be provided on the underside of each disc. That is, the discs may form a means of propulsion of craft 10, should a separate hull mounted power unit not be provided. Electric motors may be provided in each disc, or alternatively, torque may be transmitted to the discs from shafts which extend to a power unit within hull 17.

Figure 6:
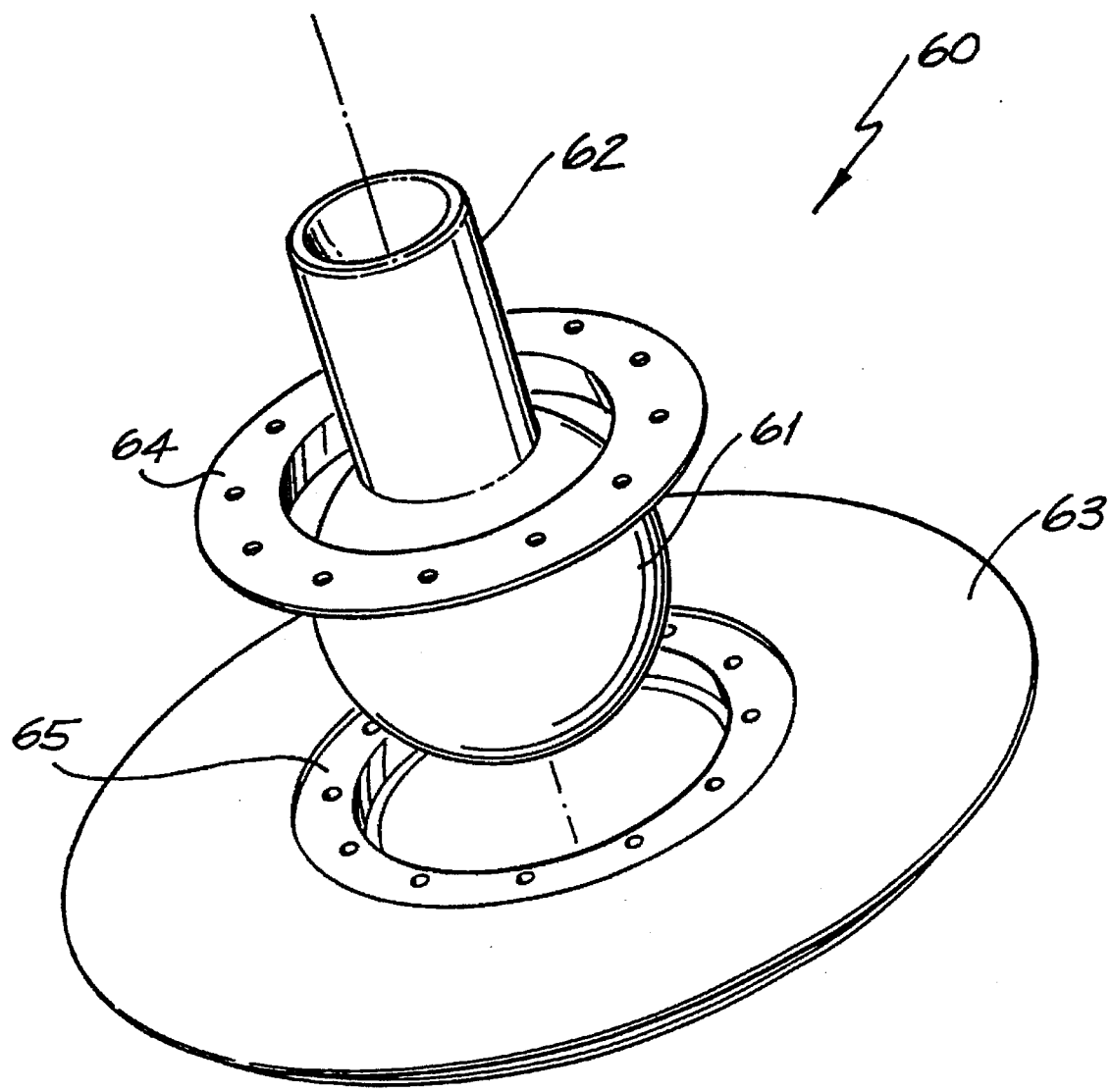
FIG. 6 is a schematic perspective exploded view of an alternative disc comprising a ball and socket arrangement.

In FIGS. 6, 7, 7A of the accompanying drawings there is schematically depicted an alternative disc fixing arrangement 60. Arrangement 60 comprises a ball joint 61 integrally formed with or attached to a leg extension 62. Leg extension 62 might be adapted to pivot about a pivot joint 67 affixed to the hull of a water craft or might be telescopically associated with another part to allow for vertical displacement of the ball joint 61. Ball 61 comprises a plurality of pits 65 within which there might be received a lubricant such as oil or water or the like. Disc 63 is secured to rotate and pivot relative to ball joint 61 and is retained by retaining flange 64 secured to disc 63. Where water is the intended lubricant, a pair of apertures 68 might extend through the base of disc 63 for the ingress of water as the disc skims thereupon. A number of pits or grooves 66 may be provided in the lower surface of the disc 63.

A water craft may be provided not only with four discs but with a multitude of discs, say for example as a pair of rows, one along each side of the craft, each of which may be individually mounted upon telescopic arms to accommodate peaks and troughs of waves as the craft is in motion.

It should be appreciated that modifications and alterations obvious to those skilled in the art are not to be considered as beyond the scope of the present invention. For example, any number of discs may be provided. For instance, where two rotating discs are provided, each located at laterally opposed positions upon the craft, a centrally located, forward skimming means may be provided. Such a skimming means might be a non-rotating disc.

I claim:

1. A water craft comprising:
   a hull having a main longitudinal axis defining a direction of travel of the craft,
   a plurality of discs mounted at respective opposed sides of the main longitudinal axis to and below the hull and in combination having sufficient buoyancy to support the hull above the water, each disc comprising an essentially circular skimming surface adapted to skim upon the water as the craft moves at speed, each disc being adapted to rotate about a rotational axis which projects laterally at an acute angle with respect to a horizontal reference plane such that the skimming surface faces downwardly and outwardly with respect to the longitudinal central axis of the hull;
   wherein the discs are pivotably mounted to the hull by way of a ball joint, the ball joint comprising a ball affixed to or integrally formed with a leg extending from the hull, the ball extending into a socket formed within the disc and being retained therein by a retention flange secured to the disc.

2. The water craft of claim 1 wherein said acute angle is less than 45°.

3. The water craft of claim 1 wherein the skimming surface of each disc is convex.

4. The water craft of claim 1 wherein the hull and discs are formed of moulded plastics material.

5. A water craft comprising:
   a hull having a longitudinal axis defining a direction of travel of the craft along a horizontal reference plane; and
   a plurality of discs disposed below the hull on opposed sides of the longitudinal axis, each disc freely rotatable about a rotational axes and having a downwardly oriented surface;
   wherein the discs have in combination sufficient buoyancy to support the hull above water, and the water flowing from the direction of travel against a portion of each downwardly oriented surface of the discs causes rotation of the discs about the rotational axis so as to reduce relative contact velocity between the discs and the water while the buoyancy of the discs supports the hull; and
   wherein a plurality of legs extend from the hull, each leg having a first bearing surface opposite the hull, and wherein a second bearing surface within each disc rotatably receives the first bearing surface of an associated leg.

6. The water craft of claim 5 wherein each downwardly oriented surface comprises a substantially convex surface.

7. The water craft of claim 6 wherein each downwardly oriented surface further comprises a plurality of concave indentations.

8. The water craft of claim 5 wherein each disc is rotatably mounted to a hub affixed to the hull, the hub maintaining an acute angle of the discs relative to the horizontal reference plane.

9. The water craft of claim 5 wherein the first bearing surface comprises a ball and the second bearing surface comprises a socket, the ball and socket defining a ball joint.

10. The water craft of claim 5 wherein the disc comprises at least one aperture extending from the downward oriented surface to the second bearing surface so that water can pass therethrough to lubricate the bearing surfaces.

11. The water craft of claim 5 wherein one of the first and second bearing surface comprises a plurality of indentations.

* * * * *